United States Patent
Carau, Sr.

(10) Patent No.: US 6,754,391 B2
(45) Date of Patent: Jun. 22, 2004

(54) SYSTEMS AND METHODS FOR RENDERING IMAGE-BASED DATA

(75) Inventor: Frank P Carau, Sr., Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/179,652

(22) Filed: Jun. 25, 2002

(65) Prior Publication Data
US 2002/0164079 A1 Nov. 7, 2002

Related U.S. Application Data

(60) Provisional application No. 09/290,047, filed on Apr. 12, 1999.

(51) Int. Cl.⁷ ................................................ G06K 9/72
(52) U.S. Cl. ..................... 382/229; 345/689; 345/788; 358/449; 358/452; 358/453; 382/177; 382/232
(58) Field of Search ............................... 358/403–406, 358/442–462, 1.11; 382/173, 176, 179, 232, 233, 248, 254; 345/689, 788

(56) References Cited

U.S. PATENT DOCUMENTS

| | | |
|---|---|---|
| 5,179,599 A | 1/1993 | Formanek |
| 5,212,739 A | 5/1993 | Johnson |
| 5,237,627 A | 8/1993 | Johnson et al. |
| 5,280,367 A | 1/1994 | Zuniga |
| 5,546,474 A | 8/1996 | Zuniga |
| 5,548,700 A * | 8/1996 | Bagley et al. ............... 715/540 |
| 5,553,205 A | 9/1996 | Murray |
| 5,596,655 A | 1/1997 | Lopez |
| 5,613,019 A | 3/1997 | Altman et al. |
| 5,634,094 A | 5/1997 | Ueda |
| 5,734,761 A | 3/1998 | Bagley |
| 5,787,418 A | 7/1998 | Hibbetts et al. |
| 5,897,644 A | 4/1999 | Nielsen |
| 5,953,735 A | 9/1999 | Forcier |
| 6,029,171 A | 2/2000 | Smiga et al. |
| 6,195,475 B1 * | 2/2001 | Beausoleil, Jr. et al. ..... 382/312 |

* cited by examiner

*Primary Examiner*—Bhavesh M. Mehta
*Assistant Examiner*—Gregory Desire

(57) ABSTRACT

Systems and methods for rendering image-based data are disclosed. A representative system includes a data interface that receives a remotely-generated data stream; a data manager coupled to the data interface, the data manager configured to translate the remotely-generated data stream into a plurality of word blocks, wherein the data manager determines for each word block of interest whether an active line can accommodate an entire word block of interest prior to registering the word block with the active line and wherein the data manager increments the active line in response to a determination that the word block of interest would not be accommodated on the active line; and a display device coupled to the data manager, the display device configured to render the plurality of word blocks. A representative method for rendering image-based data includes the following steps: receiving a remotely-generated data stream, the data stream responsive to an image of a source document, the source document comprising text characters; identifying a plurality of word blocks by analyzing gaps between the text characters defined by the data stream; registering at least one of the plurality of word blocks with a row suitable for rendering on a display device; selecting a subsequent word block from the plurality of identified word blocks; determining whether a rendered image of the entire subsequent word block can be rendered on the row; and if so, registering the entire subsequent word block on the row.

31 Claims, 5 Drawing Sheets

SYSTEMS AND METHODS FOR RENDERING IMAGE-BASED DATA

CROSS REFERENCE TO RELATED APPLICATION(S)

This is a divisional of copending application number Ser. No. 09/290,047 filed on Apr. 12, 1999, which is hereby incorporated by reference herein.

TECHNICAL FIELD

The present invention generally relates to data processing and, in particular, to systems and methods for rendering image-based data via a display screen such that each word of a row of text is simultaneously visible.

BACKGROUND OF THE INVENTION

It is often desirable for a user to be able to communicate information from various locations. Therefore, portable communications devices have been developed that allow a user to transmit and receive information when the user is at a plurality of possible locations. For example, a user traveling to different cities or other locations can utilize a portable communications device to establish communication with remote communications devices and/or networks.

Most portable communications devices include a data interface that interfaces data between the portable communications device and outside systems or devices. As an example, the data interface can be connected to and receive data from a telephone line. The data received by the data interface can then be displayed to the user via a display screen associated with the portable communications device.

To facilitate transportation, most display screens associated with portable communications devices are relatively small. In fact, many of these display screens are not large enough to display a complete line of text that has been transmitted to the communications device. Therefore, when the text is defined by ASCII code words, most portable communications devices are designed to insert a line break after the last word in the line that can be displayed on a single row of the display screen. Then, the remainder of the words in the line are displayed on the next row of the display screen. Therefore, a single line of text is displayed on multiple row(s) of the display screen, and the user is able to view each word of the line simultaneously. This process of automatically breaking a line of text to enable simultaneous viewing of each word in the line is commonly referred to as "word wrapping."

However, the data transmitted to the portable communications device is not always defined by ASCII code words. For example, in many situations, image-based data (such as facsimile data, for example) is transmitted to the portable communications device. Image-based data does not include ASCII code words but instead includes data strings that are associated with each pixel of the image defined by the image-based data. The data strings define the color or shade of the pixels of the image.

Since the text of image-based data is not defined by ASCII code words, it is difficult for most portable communications devices to identify the words of the text. Therefore, most portable communications devices render image-based data without attempting to divide or break lines of text that do not fit on a single row of the display screen. Furthermore, since the display screen is not usually large enough to display a complete line of text, most of the lines of text are not completely displayed to the user at the same time. Consequently, to read a complete line of text, the user is usually required to read a portion of the text that is currently displayed and then to pan the display of the data so that the remainder of the text is visible. As a result, a user is usually required to pan the displayed image back and forth while reading from the display screen.

It is possible to convert the image-based data received by the portable communications device into ASCII code words so that the lines of text may be divided and simultaneously displayed to the user. In this regard, an optical character recognition (OCR) device may be used to scan the lines of text and to define ASCII code words through well known techniques. However, OCR techniques are not always accurate, and the conversion of the image-based data into ASCII code words may increase the number of errors in the data. Furthermore, utilization of OCR devices in portable communications devices usually increases the size and the power of the portable communications devices to undesirable levels. Therefore, it is not always desirable to convert image-based data into ASCII code words before displaying the data to the user in portable communications devices.

Thus, a heretofore unaddressed need exists for systems and methods of efficiently rendering image-based data via a portable communications device such that each word of a line of text is simultaneously visible.

SUMMARY OF THE INVENTION

A representative system includes a data interface, a data manager, and a rendering device. The data interface receives a remotely-generated data stream. The data manager translates the remotely-generated data stream into a plurality of word blocks, wherein the data manager determines for each word block of interest whether an active line can accommodate an entire word block of interest prior to registering the word block with the active line and wherein the data manager increments the active line in response to a determination that the word block of interest would not be accommodated on the active line. The display device then renders the plurality of word blocks associated with each line.

A representative method for rendering image-based data includes the following steps: receiving a remotely-generated data stream, the data stream responsive to an image of a source document, the source document comprising text characters; identifying a plurality of word blocks by analyzing gaps between the text characters defined by the data stream; registering at least one of the plurality of word blocks with a row suitable for rendering on a display device; selecting a subsequent word block from the plurality of identified word blocks; determining whether a rendered image of the entire subsequent word block can be rendered on the row; and if so, registering the entire subsequent word block on the row.

BRIEF DESCRIPTION OF THE DRAWINGS

Systems and methods for efficiently rendering image-based data are illustrated by way of example and not limited by the implementations in the following drawings. The components in the drawings are not necessarily to scale. Emphasis instead is placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1A:
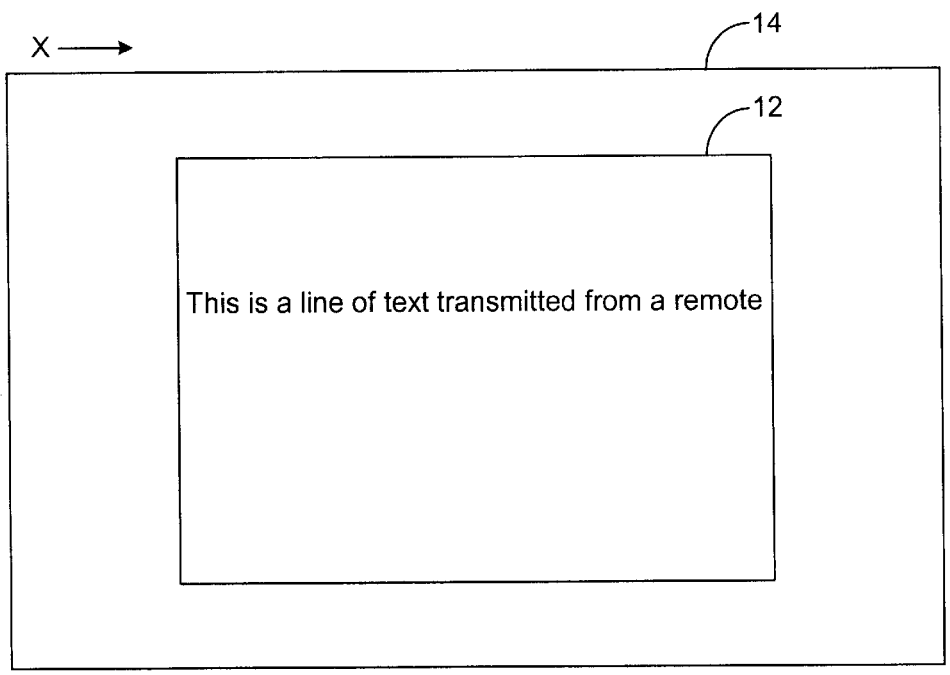
FIG. 1A is a diagram illustrating a conventional communications system displaying a portion of a line of text.
Figure 1B:
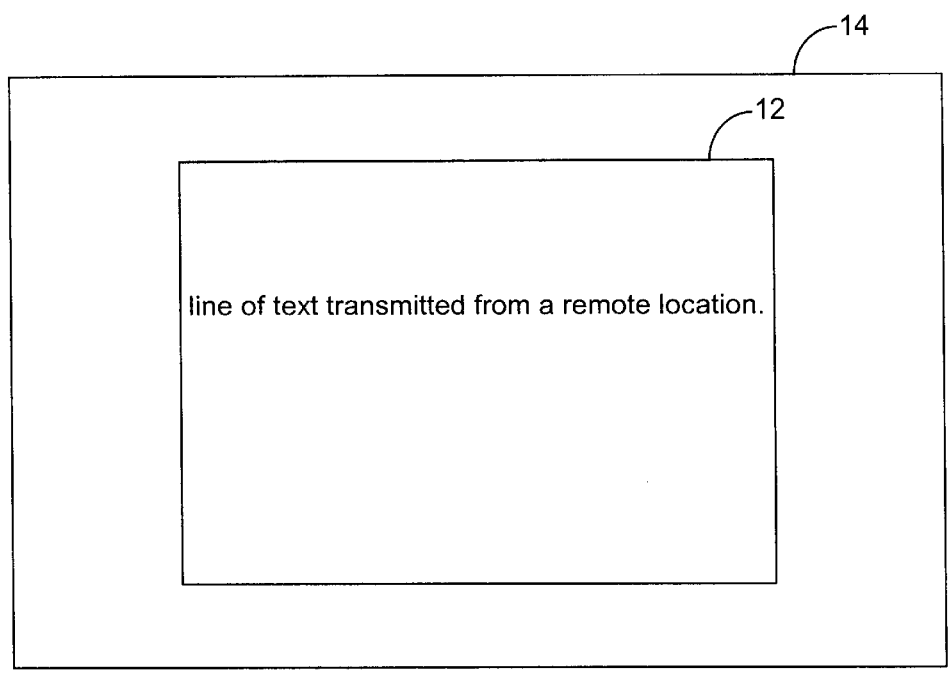
FIG. 1B is a diagram illustrating the communications system of FIG. 1A when the system displays the remaining portion of the line of text.

FIG. 1A shows an image produced by a display screen 12 of a conventional communications system 14. In this regard, the communications system 14 has received image-based data defining a line of text. The complete line reads, "This is a line of text transmitted from a remote location." However, because the width (i.e., distance in the x-direction) of the display screen 12 is too small to display the complete line of text, only a portion of the line of text is visible. The user may pan the image to display the remainder of the words in the line, as shown by FIG. 1B. However, having to pan the image to read the remainder of the line is inconvenient and inefficient.

Figure 2:
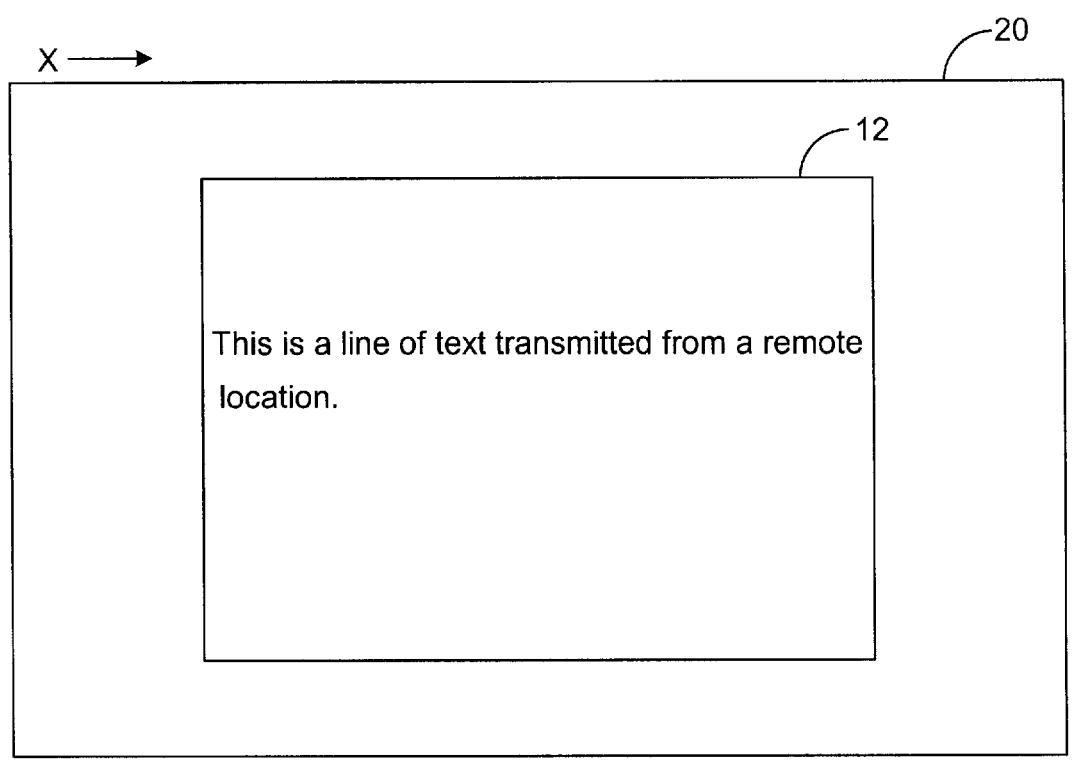
FIG. 2 is a diagram illustrating an embodiment of a communications system in accordance with the present invention displaying the line of text shown in FIGS. 1A and 1B.

The present invention enables the user to view each word in the line of text by utilizing multiple rows to display the line of text. As an example, FIG. 2 shows a communications system 20 in accordance with the present invention. As seen by FIG. 2, the line of text is displayed by two rows of the display screen 12 such that each word of the line of text is simultaneously visible to the user.

Figure 3:
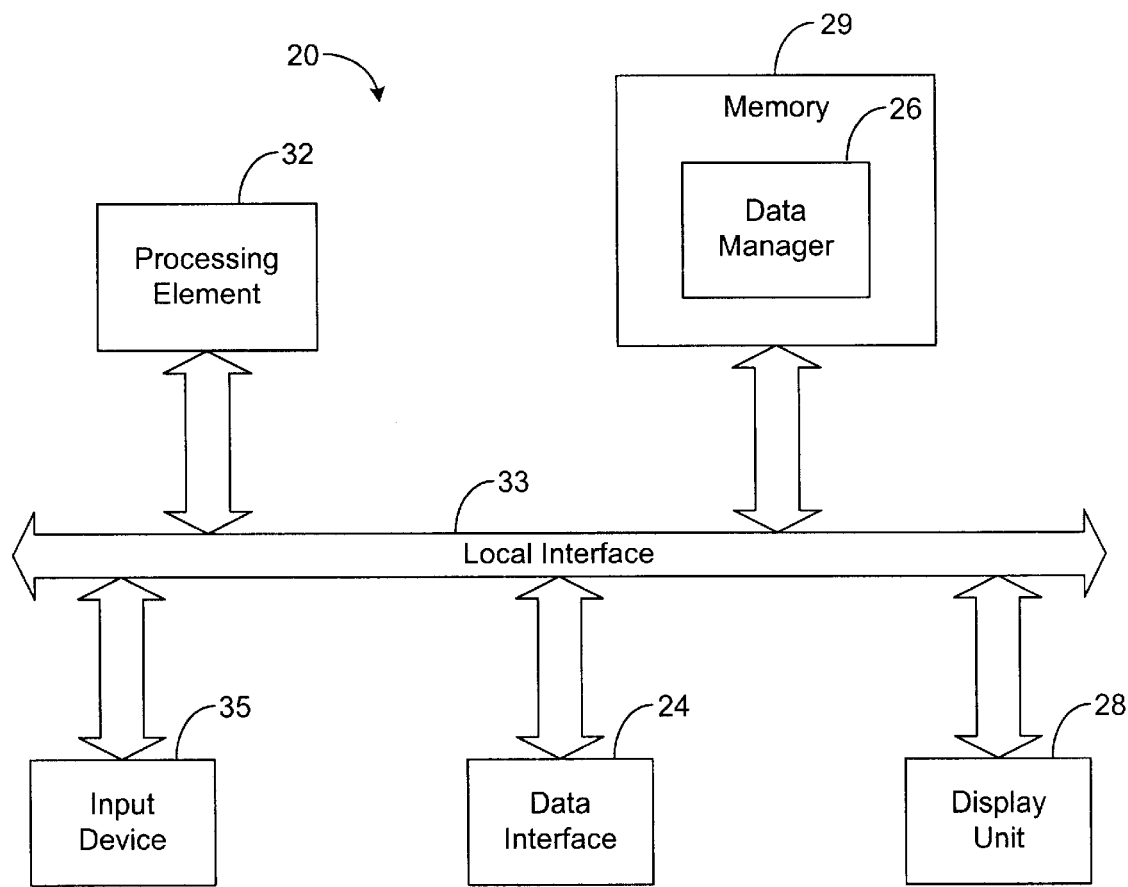
FIG. 3 is a block diagram illustrating the communications system of FIG. 2.

FIG. 3 shows a more detailed view of the communications system 20. In this regard, the communications system 20 includes a data interface 24, a data manager 26, and a display unit 28. The data interface 24 is configured to receive data that is to be displayed by the display unit 28. As an example, the data interface 24 may connect to a telephone connection or other type of medium that connects the data interface 24 with a remote network (not shown) or with a remote communications device (not shown), or the data interface 24 may be configured to receive data stored on a computer disk (not shown). The display unit 28 includes a display screen 12 (FIG. 2) that can be used via conventional techniques to display an image based on data received by the display unit 28.

The data manager 26 is configured to control the rendering of the data received from data interface 24. The data manager 26 can be implemented in software, hardware, or a combination thereof In the preferred embodiment, as illustrated by way of example in FIG. 3, the data manager 26 of the present invention along with its associated methodology is implemented in software and stored in computer memory 29.

Note that the data manager 26, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the data manager 26 may be magnetically stored and transported on a conventional portable computer diskette.

In the preferred embodiment, one or more conventional processing elements 32, such as a digital signal processor (DSP), communicate to and drive the other elements within the system 20 via a local interface 33, which can include one or more buses.

Furthermore, an input device 35, can be used to input data from the user of the system 20.

In the preferred embodiment, the data received by the data interface 24 is image-based data. Therefore, the data received by data interface 24 defines an image by providing a value for each pixel associated with the display screen 12. The data manager 26 is preferably configured to divide the image into a plurality of cells and to determine which cells include text.

In this regard, conventional optical character recognition (OCR) techniques exist for dividing an image into a plurality of cells in the process of separating text from background. U.S. Pat. No. 5,237,627, entitled "Noise Tolerant Optical Character Recognition System," U.S. Pat. No. 5,280,367, entitled "Automatic Separation of Text from Background in Scanned Images of Complex Documents," and U.S. Pat. No. 5,179,599, entitled "Dynamic Thresholding System for Documents using Structural Information of the Documents," which are all incorporated herein by reference, describe systems that divide an image into a plurality of cells to separate text from background. In general, the image is first separated into a plurality of cells, and then each cell is analyzed to determine which portions of the cells include text and which portions only include background. Thereafter, the cells can be further analyzed to determine which characters are defined by the text so that the text can be defined by ASCII code words.

Figure 4:
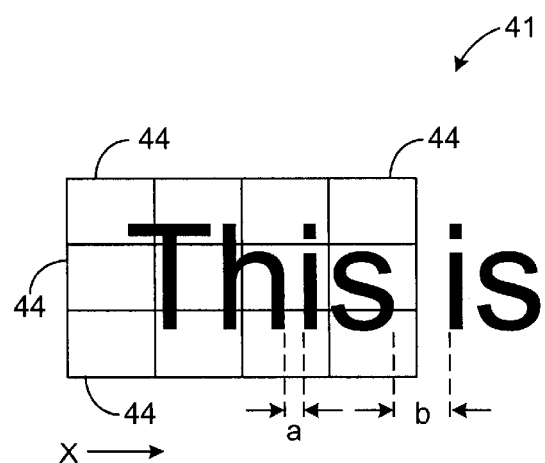
FIG. 4 is a diagram illustrating a word block.

The techniques described in the aforementioned patents for determining which portions of the cells include text are preferably used by the data manager 26 to determine which cells define a word block. A word block is a group of cells that include text defining a part of a particular word. As an example, FIG. 4 depicts a word block 41 associated with an image of the word "This." Word blocks 41 are separated from other word blocks 41 by a width (i.e., distance in the x-direction) of background that is relatively large compared to the widths of background that separate the characters of a word. Therefore, by analyzing the width of background space between text, the data manager 26 can identify word blocks 41. As an example, referring to FIG. 4, the distance "a" is much smaller than the distance "b." Therefore, based on the widths of "a" and "b," the data manager 26 can determine that the text defining the characters "h" and "i" (in the word "This") are associated with the same word whereas the text defining the characters "s" (in the word "This") and "i" (in the word "is") is associated with different words.

Therefore, the data manager 26 is designed to identify text that is separated from other text by at least a threshold width as the end of a word, and any text between two adjacent word ends is identified as a portion of a word. As an example, the text defining "T" and "s" (in the word "This") is identified as the ends of the same word by analyzing the width of background space, as described hereinabove. Since the text defining "h" and "i" (in the word "This") is between the text associated with the word ends, the text defining "h" and "i" (in the word "This") is also associated with the word block 41. Note that it is not necessary for the data manager 26 to actually determine the ASCII code for the characters that are included in the identified word. It is sufficient for the data manager 26 to identify which text (and, therefore, which portions of the image-based data received by data interface 24) are associated with the word block 41.

The data manager 26 is designed to transmit the data defining each identified word block 41 to the display unit 28 such that the display screen 12 of the display unit 28 displays multiple rows of text. In this regard, the data manager 26 is configured to define the first row of the display screen 12 with an identified word block 41. In other words, the portions of the image-based data defining the identified word block 41 are transmitted to the display unit 28. As an example, the data manager 26 may transmit to the display unit 28 each cell 44 that includes text associated with the first word block 41. The image produced by this word block 41 is positioned as the first word on the first row of the display screen 12.

The data manager 26 is then designed to render each consecutive word block 41 of the text in sequence on the same row of the display screen 12 until the data manager 26 determines that the row is complete. The row is complete when the next word block 41 would not be visible on the display screen 12 or, in other words, until the row extends further than a threshold width. The threshold width should be less than the width of the display screen 12.

When the data manager 26 determines that the row is complete, the data manager 26 is designed to render the next word block 41 (and any remaining word blocks 41) on the next row until the next row becomes complete. This process is repeated until all of the word blocks 41 have been rendered. Therefore, each word of each row displayed by the screen display 12 is visible to the user, and there is no need for the user to pan the image horizontally (i.e., in the x-direction).

It should be noted that other techniques for identifying the data associated with different words may be employed without dividing the image into cells 44. Any technique capable of identifying the words defined by the image-based data is sufficient for implementing the present invention. It should be noted that a word is "identified" when the data and/or cells defining the word is distinguished from the data and/or cells defining the background or other words. It is not necessary for the characters of the word to be determined in order for the word to be "identified."

Operation

The preferred use and operation of the system 20 and associated methodology are described hereafter.

Figure 5:
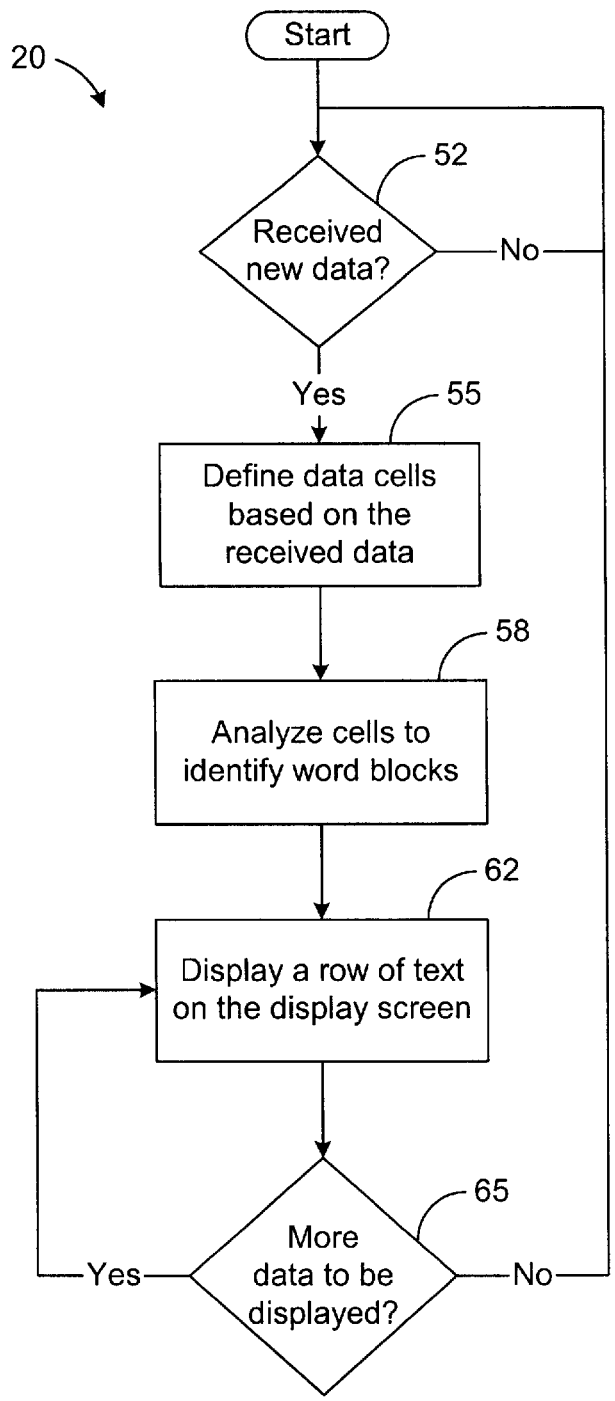
FIG. 5 is a flow chart illustrating an embodiment of the architecture and functionality of the communications system depicted by FIG. 3.

Initially, the communications system 20 receives image-based data via data interface 24, as shown by block 52 of FIG. 5. The image-based data defines an image having lines or rows of text, such as the row of text depicted by FIGS. 1A and 1B, for example. The data manager 26 defines data cells 44 based on the received data, as shown by block 55. Then the data manager 26 analyzes the cells 44 to identify word blocks 41, as depicted by block 58. A word block 41 is a group of cells 44 including text that is separated by less than a threshold width. Word blocks 41 can have various shapes and/or sizes, and the aforementioned threshold width preferably corresponds to the maximum width that may exist between characters of the same word.

Once the word blocks 41 are identified by the data manager 26, the data manager 26 defines multiple rows of text and displays these rows of text on the display screen 12, as shown by blocks 62 and 65. To display a row of text, the data manager 26 selects the first word block 41 that is to be displayed on the row of text. For example, assuming that the image data defines the phrase "This is a line of text transmitted from a remote location," the data manager selects the word block 41 defining the word "This." The data manager 26 transmits the data defining this first word block 41 to the display unit 28 to be rendered as the first word on the first row of the image produced by the screen display 12, as shown by block 67 of FIG. 6. If the first word block 41 is associated with a start of a paragraph, then the image of the first word block 41 should be indented.

Next, the data manager 26 selects the next word block 41 defined by the data (assuming that another word block 41 exists) and determines whether the next word block 41 fits on the same row of text, as shown by blocks 69 and 71. The next word block 41 fits on the row of text when the image of the next word block 41 can be simultaneously displayed on the same row of the screen display 12 along with the images of all of the other word blocks 41 already defining the row. In this regard, there is a maximum width that the rows of text displayed by the screen display 12 can be before the row becomes too long to be simultaneously displayed by the screen display 12 (i.e., before the width of the row of text exceeds the width of the screen display 12). Therefore, the data manager 26 can determine whether the next word block fits on the row of text by determining whether the width of the row exceeds this maximum width once the next word block 41 has been rendered to the row.

If the width of the row exceeds the maximum width after the next word block is added, then the next word block 41 does not fit on the row. Otherwise, the next word block 41 fits on the row and can be rendered or positioned next to the last word block 41 presently on the row, as shown by block 73. Note that it is desirable to ensure that a minimum separation width exists between the words defined by two adjacent word blocks so that the words can be identified by the user.

In the example described hereinabove, the next word block 41 defines the word "is" which is positioned next to the first word block 41 defining the word "This." After positioning the next word block 41 on the row of text displayed by the screen display 12, the data manager 26 determines whether the word block 41 just rendered defines the last word of a paragraph in block 75. If so, the data manager 26 proceeds to block 65 (FIG. 5). Otherwise, the data manager 26 returns to block 69 and determines in block 71 whether the next word block 41 (i.e., the word block 41 defining the word "a" in the foregoing example) fits on the row of text. The aforementioned process is repeated until there are no more word blocks 41 to display, until the next word block 41 will not fit on the row of text being defined by the data manager 26, or until the end of the paragraph is reached.

Figure 6:
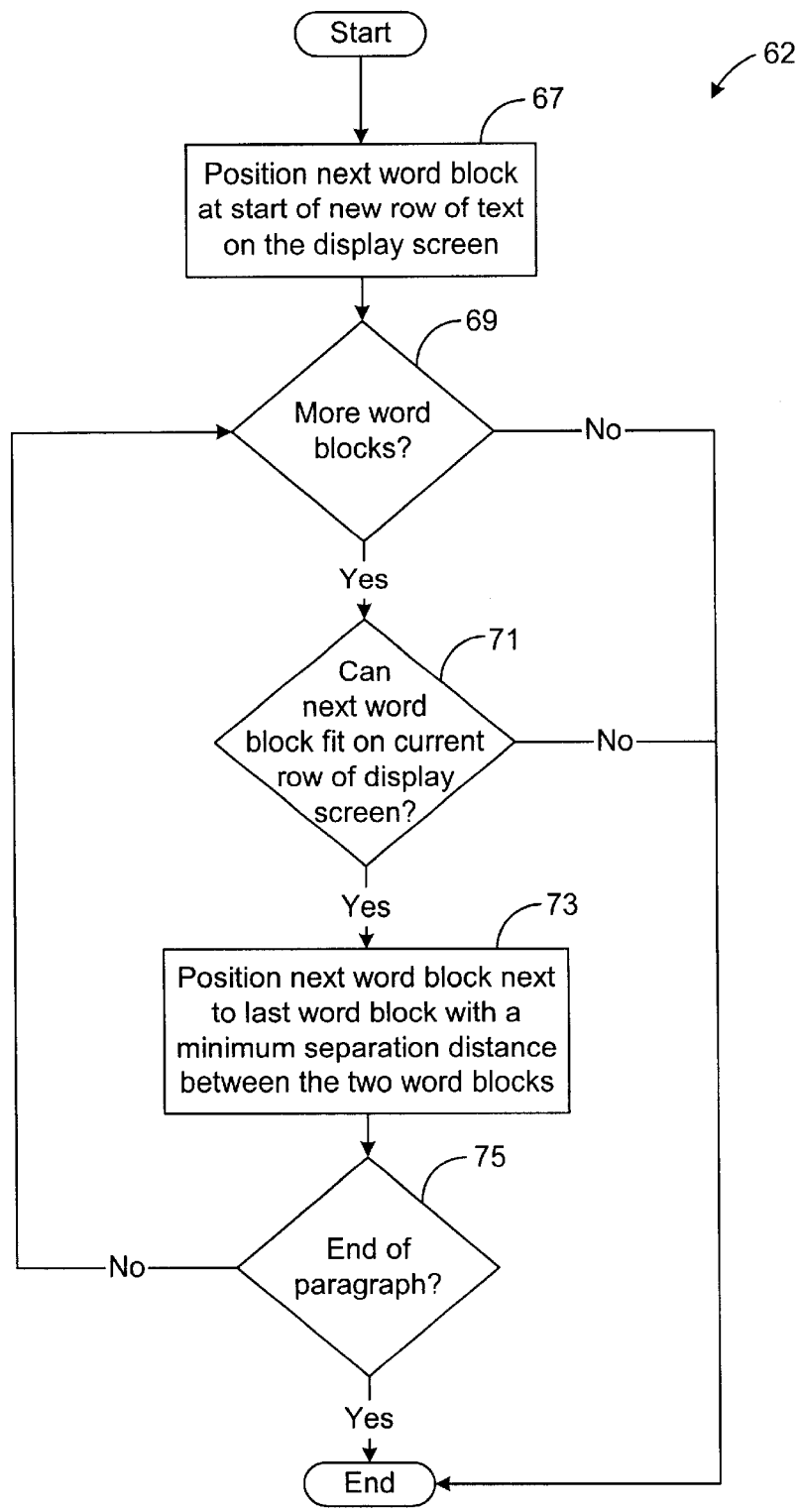
FIG. 6 is a flow chart illustrating a more detailed view of the flow chart of FIG. 5.

Once the data manager 26 determines in block 71 that the next word block 41 will not fit on the row of text or that the end of a paragraph is reached, a new row of the screen display 12 is defined. The next word block 41 is rendered as the first word on the new row of the display screen 12, as shown by blocks 62, 65 and 71 (FIGS. 5 and 6). Then, the process of selecting the next word block 41 and rendering the next word block 41 to the same row is repeated, as shown by blocks 69–75. In the example described hereinbefore, the end of the first row displayed by the display screen 12 is reached after the word blocks 41 defining the words "This is a line of text transmitted from a remote" have been rendered. Since the word "location" would not be simultaneously visible with the other words if positioned next to the word "remote" (i.e., since the word block 41 defining the word "remote" does not fit on the same row of the screen display 12), the data block 41 defining the word "location" is rendered as the first word of a new row. Therefore, the word "location" is displayed on the new row of the display screen, as shown by FIG. 2.

The process depicted by FIGS. 5 and 6 is continued until each word block 41 of the data has been rendered. Since none of the rows of text produced by the aforementioned process are wider than the display screen 12, each word of each row is visible to the user when the row is being displayed by the display screen 12. Consequently, the user does not need to horizontally pan the image of the display screen 12 in order to read each word of any row.

It should be noted that the data manager 26 preferably detects the beginning of a paragraph (and, therefore, the end of the preceding paragraph) by analyzing the image-based data received at block 52. In this regard, the beginning of a paragraph is normally indented, or the distance between the text of paragraphs is normally greater than the distance between the textual lines of a paragraph. Therefore, the data manager 26 can detect the beginning or ending of a paragraph by analyzing the width of blank space preceding a line of text or by analyzing the distance between the lines of text defined by the image-based data.

In this regard, if the blank space preceding a line of text exceeds a threshold value, then the data manager 26 determines that the line of text is the first line of a paragraph. Furthermore, if the blank space separating a line of text from an adjacent line of text exceeds another threshold value, then the data manager 26 determines that the line of text is either the first line or the last line of a paragraph depending on whether the line of text precedes or follows the adjacent line of text. Once the first and last lines of each paragraph have been determined, the data manager 26 can identify the first and last word blocks 41 in each paragraph. In this regard, the first word block 41 of a paragraph is the first word block 41 on the first line of a paragraph, and the last word block 41 of a paragraph is the last word block 41 on the last line of the paragraph. Consequently, by analyzing the image-based data received at block 52, the data manager 26 in block 75 can determine when the end of a paragraph has been reached.

Although the example described hereinabove utilizes the single exemplary line of text shown by FIGS. 1A and 1B, it should be apparent to one skilled in the art that the methodology described herein enables a plurality of lines to be rendered according to the principles of the present invention. Therefore, multiple lines of text (including multiple paragraphs) defined by image-based data can be word wrapped by the system 20 via the techniques described hereinabove.

Any process descriptions or blocks in the flow diagrams of FIGS. 5 and 6 should be understood as representing modules, segments, or portions of code which include one or more executable instructions for implementing specific logical functions or steps in the process for presenting a representation of a source object. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The detailed description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

Therefore, having thus described the invention, at least the following is claimed:

1. A communication system for rendering image-based data, comprising:

a data interface configured to receive a remotely-generated data stream, the data stream responsive to image information describing a source document, the source document including text;

a data manager coupled to the data interface, the data manager configured to translate the remotely-generated data stream into a plurality of word blocks by identifying when a plurality of contiguous picture elements are associated with a value indicating that the contiguous picture elements are background picture elements, wherein the data manager determines for each word block of interest whether an active line can accommodate an entire word block of interest prior to registering the word block of interest with the active line and wherein the data manager increments the active line in response to a determination that the word block of interest would not be accommodated on the active line; and a display device coupled to the data manager, the display device configured to render the plurality of word blocks in accordance with each respective line defined by the data manager.

2. The system of claim 1, wherein the data manager is configured to associate a plurality of subsets of the plurality of picture elements with a respective cell identifier.

3. The system of claim 2, wherein the respective cell identifier is selected from the group consisting of background and text.

4. The system of claim 1, wherein the data manager applies a word block length to determine whether an active line can accommodate the word block of interest.

5. The system of claim 4, wherein the data manager uses the word block length to form a cumulative line length.

6. The system of claim 5, wherein the cumulative line length comprises the sum of word block lengths associated with registered word blocks.

7. The system of claim 5, wherein the cumulative line length comprises a function of a word gap length.

8. The system of claim 1, wherein said data manager is configured to identify word blocks by analyzing the relative space between adjacent text characters.

9. The system of claim 8, wherein analyzing the relative space between adjacent text characters comprises a comparison to a threshold value.

10. The system of claim 9, wherein the threshold value is determined in response to an average word gap length recorded over at least a portion of the source document.

11. The system of claim 1, wherein the remotely-generated data stream comprises a facsimile of the source document.

12. A method for rendering image-based data, comprising:
receiving a remotely-generated data stream, the data stream responsive to an image of a source document, the source document comprising text characters;
identifying a plurality of word blocks by identifying when a plurality of contiguous picture elements are associated with a value indicating that the contiguous picture elements are background picture elements between the text characters defined by the data stream;
registering at least one of the plurality of word blocks with a row suitable for rendering on a display device;
selecting a subsequent word block from the plurality of identified word blocks; determining whether a rendered image of the entire subsequent word block can be rendered on the row; and
if so, registering the entire subsequent word block on the row.

13. The method of claim 12, further comprising:
registering the entire subsequent word block on a subsequent row in response to a negative determination.

14. The method of claim 12, further comprising:
analyzing a plurality of gaps between adjacent text characters defined by the data stream to identifying word blocks.

15. The method of claim 14, further comprising:
deriving a threshold value responsive to the analyzing step.

16. The method of claim 12, further comprising:
determining whether the entire subsequent word block defines an end of a paragraph;
if so, selecting a next subsequent word block in response to an affirmative result from the end of paragraph analysis; and
registering the next subsequent word block on the next subsequent row.

17. The method of claim 12, further comprising:
providing a display device; and
rendering an image of the received source document in accordance with the registered plurality of word blocks.

18. The method of claim 17, wherein rendering comprises:
transmitting the registered plurality of word blocks and a word gap length to the display device.

19. The method of claim 18, wherein rendering comprises:
filling a portion of the display with background pixels responsive to the word gap length.

20. A computer-readable medium having a program for displaying an image of a source document, the program comprising:
logic configured to receive a pixel representation of an image, the image comprising a source document, the source document including text;
logic configured to identify a plurality of word blocks responsive to text within the pixel representation of the image;
logic configured to register a present word block of interest of the plurality of word blocks with a representation of a present row of interest in response to a determination that the present word block of interest can be displayed in its entirety on a rendered version of the present row of interest, wherein the logic configured to register registers a present word block of interest on a subsequent row in response to a determination that the present word block of interest exceeds an available display width associated with the present row.

21. The computer-readable medium of claim 20, wherein the logic configured to receive acquires a facsimile of a text message.

22. The computer-readable medium of claim 20, wherein the logic configured to identify a plurality of word blocks generates a plurality of cells responsive to information associated with pixels within each respective cell.

23. The computer-readable medium of claim 22, wherein each of the plurality of cells is associated with a cell identifier.

24. The computer-readable medium of claim 23, wherein the cell identifier is selected from the group consisting of background and text.

25. The computer-readable medium of claim 20, wherein the logic configured to register determines that the present word block of interest can be displayed in responsive to a cumulative line length.

26. The computer-readable medium of claim 25, wherein the cumulative line length comprises a sum of a word block length associated with each registered word block and a word gap length.

27. The computer-readable medium of claim 25, wherein the determination is responsive to a comparison with a line width.

28. A communication system for rendering image-based data, comprising:
means for acquiring a pixel representation of a source document, the source document including text;
means for analyzing the pixel representation to define a plurality of word blocks within the pixel representation;
means for analyzing the plurality of word blocks to associate a word block length with each respective word block; and
means for determining whether a present line can accommodate a word block of interest in its entirety prior to registering the word block of interest with the present line.

29. The system of claim 28, further comprising:
means for dividing the pixel representation into a plurality of cells responsive to the image content contained within a subset of the pixels; and
means for determining when each of the plurality of cells contains an image of text.

30. The system of claim 28, wherein the means for determining whether a present line can accommodate the word block of interest registers the word block of interest with a subsequent line in response to a determination that the word block of interest would not be accommodated on the present line.

31. The system of claim 28, further comprising:
means for rendering the present line, wherein the present line comprises a representation of each of the registered word blocks associated with the present line.

* * * * *